United States Patent [19]

Schifftner

[11] 4,432,914
[45] Feb. 21, 1984

[54] MASS TRANSFER CONTACT APPARATUS

[75] Inventor: Kenneth C. Schifftner, Danbury, Conn.

[73] Assignee: Kenneth C. Schifftner, Inc., Franklin Lakes, N.J.

[21] Appl. No.: 496,054

[22] Filed: May 19, 1983

Related U.S. Application Data

[63] Continuation-in-part of Ser. No. 391,139, Jun. 23, 1982, abandoned.

[51] Int. Cl.$^3$ .............................................. B01F 3/04
[52] U.S. Cl. .................................... 261/111; 261/98; 261/100; 261/110
[58] Field of Search ............... 261/111, 98, 100, 105, 261/109, 108, 110, 113

[56] References Cited

U.S. PATENT DOCUMENTS

| | | | |
|---|---|---|---|
| 774,207 | 11/1904 | Steinbart | 261/111 |
| 1,986,736 | 1/1935 | Mauthe et al. | 261/111 |
| 2,458,909 | 1/1949 | John | 261/100 |
| 3,036,417 | 5/1962 | Mare et al. | 261/111 |
| 3,395,656 | 8/1968 | Ford et al. | 261/111 |
| 3,739,551 | 6/1973 | Eckert | 261/98 |
| 3,761,064 | 9/1973 | Selway | 261/108 |
| 3,765,659 | 10/1973 | Reilly | 261/111 |
| 3,795,486 | 3/1974 | Ekman | 261/111 |
| 3,941,572 | 3/1976 | Uchiyama et al. | 261/113 |
| 3,969,447 | 7/1976 | Glitsch et al. | 261/111 |

FOREIGN PATENT DOCUMENTS

| | | | |
|---|---|---|---|
| 335803 | 9/1903 | France | 261/98 |
| 613424 | 11/1926 | France | 261/109 |
| 899222 | 5/1945 | France | 261/98 |
| 718687 | 2/1980 | U.S.S.R. | 261/111 |

*Primary Examiner*—Tim R. Miles
*Attorney, Agent, or Firm*—W. Patrick Quast

[57] ABSTRACT

There is disclosed an improved mass transfer or gas-liquid contact device having a specially contoured grid member(s) interposed in the gas flow of the device. Ideally the grid member(s) has a cross-sectional profile which equals the sum of the theoretical velocity pressure profile of the gas flowing in an open vessel and the static and dynamic heads of the contacting liquid. An additional depth is added to the grid approximately 5 to 40% more, to create an energy imbalance in favor of the introduced liquid, thereby allowing it to drain. In existing vessels where it is desirable to replace prior art devices with an apparatus embodying the present invention, a plurality of grid modules may be employed, each module including a shaped grid or grid pair approximating the velocity profile of the gas stream in each.

10 Claims, 9 Drawing Figures

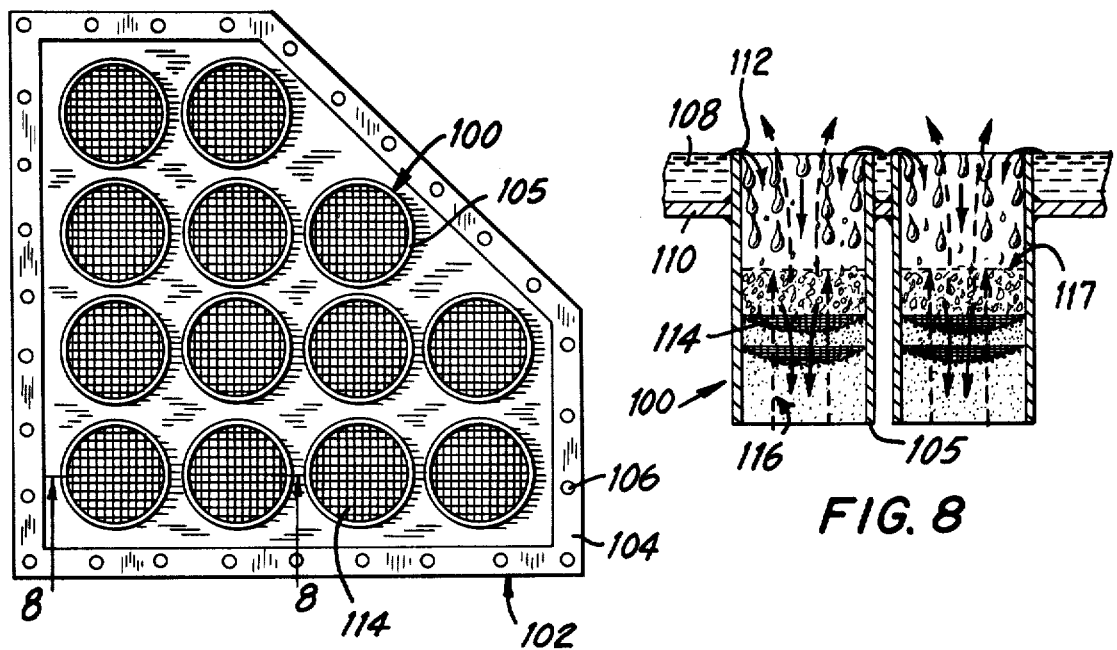
FIG. 6
FIG. 8
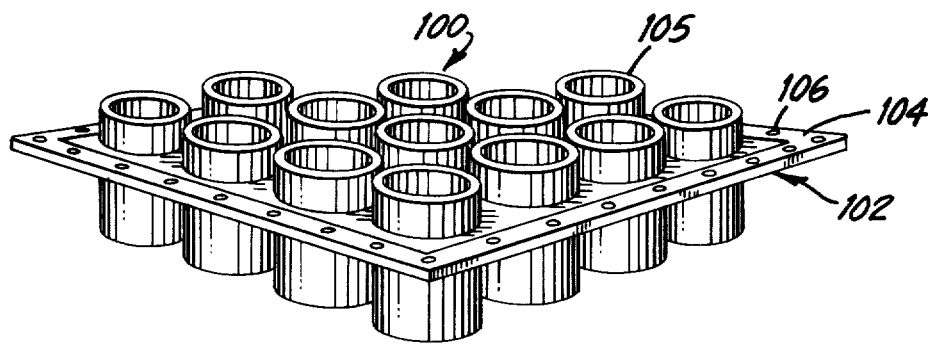
FIG. 7
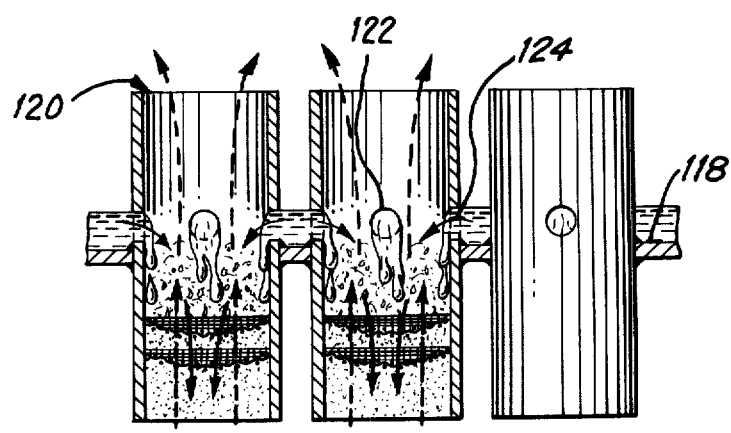
FIG. 9

MASS TRANSFER CONTACT APPARATUS

CROSS REFERENCE TO RELATED APPLICATION

This is a continuation-in-part of my copending patent application Ser. No. 391,139, filed June 23, 1982 now abandoned.

TECHNICAL FIELD

This invention describes a mass transfer contact apparatus including a gas or liquid scrubber for removal of solid or liquid particles entrained in a gas stream and/or for removal of soluble gaseous constituents of a gas stream. It is also generally applicable to any like gas treatment operations which require basically an intimate contact between a gas and liquid. Such operations may include effecting heat exchange between gases and liquids in general; mass transfer; the drying of a liquid saturated or partially saturated gas stream by contact with a chilled liquid; stripping; distillation; and others.

BACKGROUND

In the chemical engineering art in addition to the gas scrubbing process described in my aforementioned application there are many instances where mass transfer reactions, energy transfer reactions, and chemical reactions or combinations of these are carried out by bringing a gas or vapor and a liquid into intimate contact with each other, usually within a vessel. In continuous processes, liquid and gas feed stock streams are continuously introduced to the gas-liquid contact vessel, and gas and liquid product streams are continuously withdrawn. The flow paths of the two streams through the vessel are in most instances of the countercurrent type, with the liquid being introduced at or near the top of the vessel, and withdrawn at the bottom, and with the gas being introduced at or near the bottom of the vessel and withdrawn at the top. In some instances, concurrent flow, with both streams moving through the vessel in the same direction, is employed.

It is the practice to mount within the gas-liquid contact vessel passive apparatus or structure intended to insure that the liquid and gas achieve the desired degree of contact with each other so that the planned reaction occurs at the designed rate. The internal structure is passive in the sense that it is not power driven and has few or no moving parts. (Those parts that do move do so under the influence of the gas or liquid moving through the vessel.) Various kinds of structures have been employed, including bubble trays, packed columns, and grids. Ideally, the design of the vessels must include process, operational and constructional considerations. The contact reaction must be effective and efficient from a quality (purity) and quantity (yield) point of view. Further, it must use energy supplied efficiently as well as accomplish the reaction with a minimum pressure drop. Also, the apparatus should be simple and economical to build and easily cleaned and maintained. Further, vessel size is important. Desirably, the vessel should be as small and short as possible.

The foregoing considerations may be summarized as follows: it is desirable that gas-liquid contact apparatus produce good product quality and yield, at a good energy efficiency and low pressure drop; that it be practical and simple to connstruct and maintain; and that its size and the tower size be minimized while throughput capacity is maximized.

It is therefore a primary object of this invention to provide a gas-liquid contact apparatus which substantially satisfies these considerations providing high efficiencies at lower, installed and operating costs.

DISCLOSURE OF THE INVENTION

Towards the accomplishment of this and other objects which will become apparent from a reading of the accompanying specification and drawings, there is disclosed an improved gas-liquid contact device having a specially contoured grid member(s) interposed in the gas flow of the device. Ideally the grid member(s) has a cross-sectional profile which would equal the algebraic sum of the theoretical velocity pressure profile of the gas flowing in an open vessel and the static and dynamic heads of the contacting liquid. This is practically approximated by the free hanging catenary shaped grid described. An additional depth is added to the grid, approximately 5 and 40% more, to create an energy imbalance in favor of the introduced liquid, thereby allowing it to drain. The grid member(s) can be made of rigid or flexible materials, the latter facilitating cleaning. The grids can be arranged singularly, or in pairs separated by a predetermined distance. The latter arrangement provides further improved particulate removal. The device can be used on countercurrent and co-current systems, i.e. the contacting liquid injected opposite the gas flow, or with the gas flow. Grid members are effective with grid open areas upwards of 75% and even higher.

Although the catenary shaped grid provides the least structural complexity in approximating the parabolic shape of the velocity pressure profile of the gas stream, the desired grid shape can be approximated, e.g., through the use of a shallow cone or series of cones, or by a formed shape, with varying degrees of efficiency. Further, in existing vessels where it is desirable to replace prior art devices with an apparatus embodying the present invention, and where existing structure makes it impractical to utilize the one piece grid a plurality of grid modules may be employed. Each of these modules are designed including a shaped grid or grid pair approximating the velocity pressure profile of the gas stream in each such that the net effect substantially approaches what would be achieved if the single grid or grid pair were suspended in the vessel.

BRIEF DESCRIPTION OF THE DRAWINGS

FIG. 6 is a plan view of a quarter section of the grid module version of the invention.

FIG. 7 is a perspective view of the section shown in FIG. 6.

FIG. 8 is a elevation view taken along lines 8—8 of FIG. 6.

FIG. 9 is a front elevation view, partly in section, of the grid module/version depicting a second embodiment including a different way for dispensing the liquid onto the grid structure.

DESCRIPTION OF THE BEST MODE

It is to be understood that the principles of the present invention have broad application to many types of gas-liquid contact devices. For purposes of illustration, however, the following description will elaborate on a gas scrubbing device.

Figure 1:
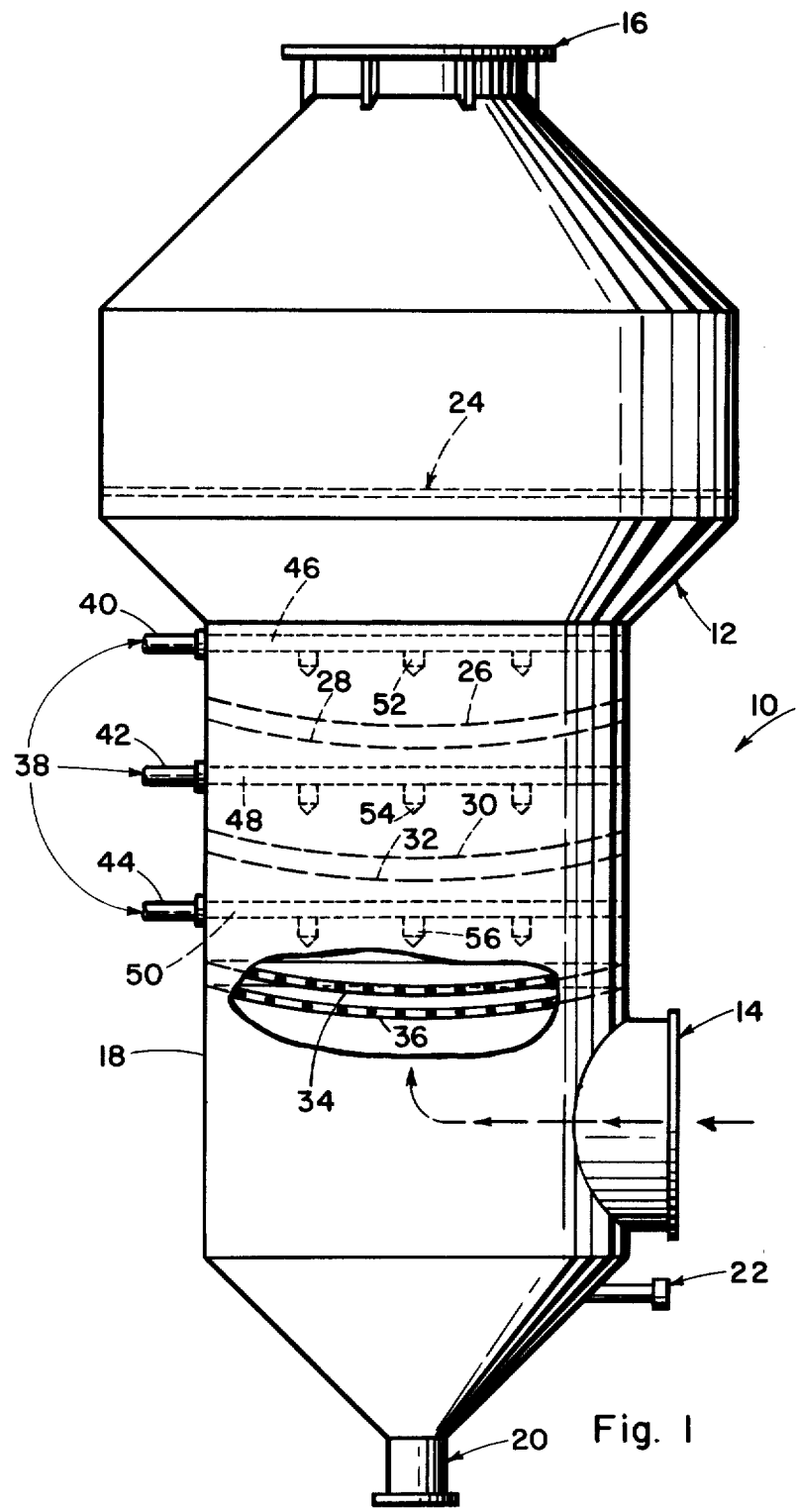
FIG. 1 is an elevation view partially in section depicting a gas liquid contact device, a gas scrubbing device, employing the principle of the present invention.

Referring to FIG. 1, the device 10 includes a housing member 12 having an inlet and outlet, 14 and 16, for passing the contaminant gas. Between these is the scrubbing vessel 18 or ductwork.

Items found on the vessel essentially unrelated to the present invention include a drain outlet 20; liquid connection 22 for recirculation purposes; and a chevron or mist eliminator 24.

Suspended within the vessel are a plurality of grid members 26 through 36. These are hung from the sides of the vessel by suitable means, not detailed, such as a circular rim piece. The grid members are oriented such that they are essentially perpendicular to the direction of gas flow.

In this figure, the grid members are shown in pairs, however, as will be seen from the subsequent discussion, the principles of the invention apply for a single grid member as well.

It is apparent from FIG. 1 that the grid members 26 through 36 are contoured, having an apparent, shallow, parabolic shape. The particulars of the design and how it is arrived at, will likewise be explained hereinafter.

In the embodiment shown, positioned above each grid pair are means 38 for dispensing the scrubbing liquid onto the concave side of the upper grid member in each pair. The dispensing means include headers 40, 42 and 44 which are connected to a scrubbing liquid supply. Internal piping 46, 48 and 50 distribute the liquid to a plurality of, typically, low pressure (5-10 psig) nozzles, of open mixing design, including 52, 54 and 56. These dispense the liquid in droplet form across the breadth of the vessel, onto the upper surface of the top grid member 26, 30 and 34. A variety of liquid injection means (spray, freeflow, tangential, weirbox, etc.) can be employed since the method of liquid injection has little to do with the performance of the invention disclosed.

THEORY

When gases pass through a duct or scrubber vessel, a velocity pressure profile results which appears to approximate a shallow parabola. The velocity pressure is maximum in the center of the vessel, decreasing to nearly zero at the wall.

The unit mass flow rate at any given point can be described (assuming a homogeneous mixture) as:

$$M_x = V_{Gx}\rho$$

where
$M_x$ = Mass flow rate (lb/ft$^2$/sec)
$V_{Gx}$ = Velocity of the gas (feet/sec) at point x $\rho$ = Density of the gas (lb/ft$^3$)

Thus, the unit mass flow rate is greatest at the center of the vessel.

As the tower gas velocity increases (above 10-15 feet/second), this effect becomes more pronounced. The mass flow rate in the center can be hundreds of times that at the wall.

If scrubbing liquid is sprayed or distributed uniformly across the diameter of the vessel, the ratio of the scrubbing liquid to mass flow at any point x is:

$$L/M_x$$

Where
L = Liquid rate (gps)
$M_x$ = Mass flow rate (lb/ft$^2$/sec) at point x.

This provides an indication that the absorption rate of gas scrubbers operating at a fixed temperature is related to the specific quantity of scrubbing liquid exposed to the contaminated gas.

Thus, the rate of absorption, impaction or interception varies across the diameter of the scrubber. It is actually lower at the center than at a point midway between the wall and the center, since the gas velocity is greater at the center ($M_x$ is greater, therefore $L/M_x$ is lower).

If one were to proportion the spray across the vessel diameter to compensate for the foregoing, the performance would decrease. This results from the contact time of gas and liquid being lower at the center given the higher gas velocity. The fact that the spray falls due to the combined initial velocity plus the acceleration of gravity, further aggravates the situation.

Or, if one were to spray more liquid downward against the gas (in the case of counter current flow) or less liquid with the gas (in the case of cocurrent flow) in the center zone, distribution and gas mixing problems would occur.

If, however, an appropriately shaped grid has its perigee located at a sufficient depth below the contact point of the grid with the vessel side wall, the cross-sectional profile of the grid approximating the velocity pressure profile (in the mirror image) of the contaminant gas rising in the vessel, the effects of the velocity pressure on the rate of absorption etc. can be largely cancelled out. As a result, more scrubbing liquid is provided in this high velocity zone and also, by creating more central zone resistance to gas flow, the flow of gas nearer the wall can be increased. Thus, the entire vessel is better utilized.

The grid can be made of metallic or non-metallic, flexible materials. It can be preformed grid pressed intoa shape approximating the velocity profile. Or, the shape required can be approximated through use of a shallow cone mesh or segments of cone meshes connected together to approximate the shape. A non-rigid grid can be mechanically flexed to facilitate cleaning, if necessary. No internal beams or other structural members need be used.

The net open area of the grid is selected to accommodate various conditions. For example, the open area will tend to be lower where it is necessary to conserve on the amount of scrubbing liquid to be used; to reduce abrasion of the grid member; or increase its structural strength (for large vessel spans). Conversely, it is desirable to have a greater open area where energy demands need to be restricted; or where large amounts of scrubbing liquid are employed (where gaseous contaminant concentrations are high); or to facilitate the drainage of scrubbing liquids containing higher percentages of solids, such as limestone slurry, or where dense particulate contamination is found. Generally, it has been found that the net open area normally runs between 50% and 75%, although an open area on the order of up to 85% to 90% has been used. However, at this high end, the performance of the grid scrubber approaches that of the conventional spray tower, with its attending problems.

In setting the shape of the grid, its depth at any point across the vessel, $d_x$, is given by the following equation:

$$d_x(\text{inches}) = P_{vx} + H_{SL} + H_{DL} \quad \text{(Formula 1)}$$

where $P_{vx}$ = velocity pressure of the gas at point x,
$H_{SL}$ = the static head of the scrubbing liquid,
$H_{DL}$ = the dynamic head of the scrubbing liquid.

Note, this is an algebraic sum and the relative signs of the components must be taken into consideration, so that the equation has application both to cocurrent as well as counter current application. If pressures acting upward are taken as negative, then downward pressures would be taken as positive.

$H_{SL}$ and $H_{DL}$ are relatively constant across the vessel.

Since a flexible grid, if supported at its perimeter will hang in a substantially parabolic curve (a catenary shape and the approximate shape of the ideal grid profile), the calculation is simplified if only the depth of the grid, dc, at the center of the vessel is calculated.

$$d_c = P_{vc} + H_{SL} + H_{DL} \quad \text{(Formula 2)}$$

Using the following conventional pitot tube equation, the velocity pressure of the gas in inches of water can be determined.

$$\frac{Q_{AVG}}{A_o} = V_{GAVG} = 1096.2 \sqrt{\frac{P_{vAVG}}{\rho}} \quad \text{(Formula 3)}$$

where $V_{GAVG}$: is the average of the gas velocity
$Q_{AVG}$: is the flow rate in ft³/min
$A_o$: is the vessel cross sectional area in ft²
$\rho$: is the carrier gas density in lbs. per ft³ for the temperature and pressure conditions in effect.

solving for $P_{vAVG}$ knowing the flow rate and vessel area $$P_{vAVG} = \left(\frac{Q_{AVG}}{A_o}\right)^2 \left(\frac{\rho}{1096.2}\right)^2$$

The value arrived at for $P_{AVG}$ is then converted in standard procedure to the gas pressure at the center, $P_{vc}$ by multiplying by 1.1, since formula 3 represents the average gas velocity pressure, not the pressure in the center.
Therefore $$P_{vc} = 1.1 \, P_{vAVG}$$

$H_{SL}$, the static head of the scrubbing liquid can be determined as follows:

$$H_{SL} = (L/\rho_l)(R/A_{OG})$$

where

L: is the liqud flow rate in gal/min.
$\rho_l$: is the density of the liquid in gal/ft³
$A_{OG}$: is the grid open area in ft²
R: is an empirically determined retention time in min. for the grid, which typically is a minimum of 0.1/60 sec./min. or 0.0017 min.

$H_{SL}$, in feet of water, is then converted to inches of water by multiplying by 12.

$H_{DL}$, the dynamic head of water, is a small factor and not of serious practical concern. It is the velocity pressure of the scrubbing liquid if applied by spray nozzles at close proximity to the grid.

If the perigee of the catenary grid is set exactly at $d_c$, an energy equalibrium condition exists between the liquid and the gas. Liquid introduced to the top of the grid is suspended, fluidized, but does not drain.

Experimentation has shown, however, that practically speaking, it is desirable to create an equilibrium imbalance in favor of the scrubbing liquid. This is achieved by further deepening the shaped grid. This depth increase, d+, can vary depending on many things including:

whether the contaminant gas includes particulate matter or not;
the contaminant gas density;
viscosity of the scrubbing liquid;
tower gas velocity;
acceptable degree of abrasion or erosion of the grid memnber; and others.

For example, tests conducted have shown that the increased depth can vary from 5% (for particulate-free gas) to 40% (for entrained particles), over the figure, $d_c$, calculated above.

Figure 2:
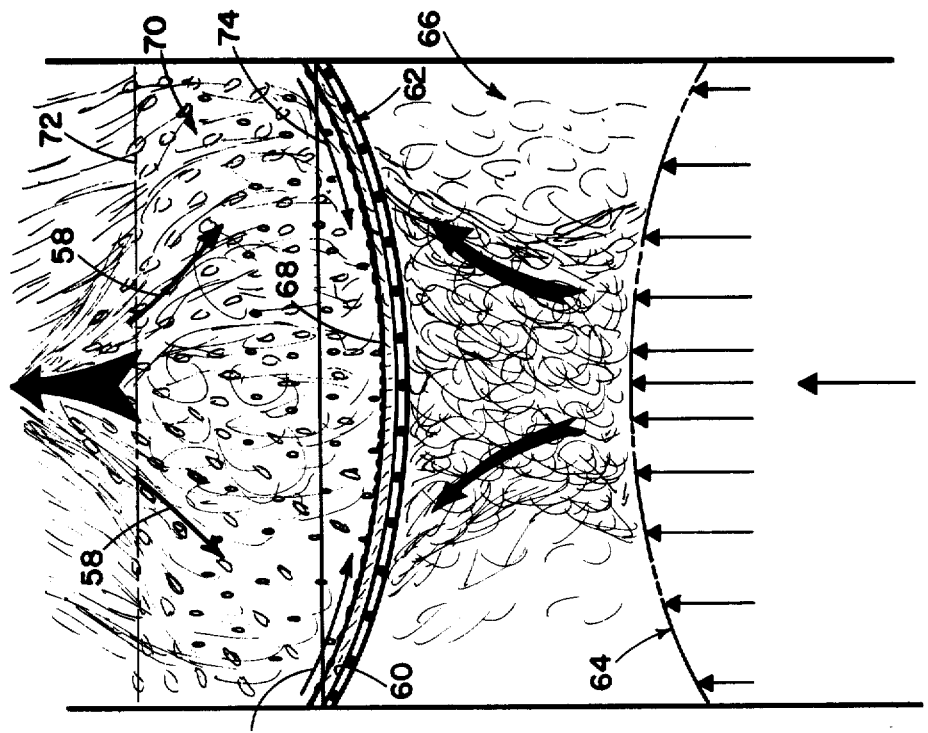
FIG. 2 is a schematic representation depicting the relationship between the velocity profile of the flowing gas and the grid member design.

A schematic diagram depicting the liquid and gas interface around a single grid is shown in FIG. 2. The scrubbing liquid 58 is shown being dispersed towards the interface from above. As noted earlier, it can be introduced onto the top surface 60 of the grid 62, in a variety of ways. This is not critical to the operation of the fluidized zone described hereinafter.

The flowing gas is depicted as having a velocity pressure profile 64. When the gas reaches the catenary shaped grid 62 a zone of high turbulence 66 is created on and below the grid. Further, a gas-liquid contacting surface 68 results which is uniformly distributed above and across the top surface of the grid.

Above this contact surface 68, there is also crafted a fluidized bed or zone in which droplets of the scrubbing liquid and randomly dispersed, contaminant gases efficiently interact. This results in the improved absorbative characteristic of the present invention. The height of the fluidized zone will be a function of the droplet size and the velocity of the gas. The higher the fluidized zone, the greater the gas absorption and particulate removal. For a properly dished grid the top surface of the zone, 72, is substantially flat as shown. With a shallower dish configuration, the center area of the top surface rises up higher than the area near the vessel sides reflecting less dispersement of the gases towards the sidewall and less effective scrubbing of the gas. In fact, flow through of the gases can occur for dished grids which are too shallow.

Because of the energy imbalance in favor of the scrubbing liquid, the liquid droplets in the fluidized zone will eventually collect and drain after a certain "operating" time in the zone. Drainage occurs primarily near the center of the grid. The drained liquid collects in a sump below for extraction, reprocessing and reuse. Operating times of a droplet of liquid in the fluidized zone vary depending on many factors, and have been experimentally determined to be as high as 3 to 4 seconds.

The above effects have been verified by photographs and laboratory tests, field pilot testing and analysis.

Because of the shaped grid, the velocity pressure profile of the flowing gases becomes more uniform, with gases from the center dispensing towards the vessel walls. Liquid flow above the grid counters this movement, on a path 74 in from the walls towards the center.

In situations where the primary contaminant is gaseous in nature, the catenary grid scrubber with a single grid has been found effective.

Pilot tests using $SO_2$ as the contaminant and limestone slurry as the scrubbing liquid have shown significant improvement in $SO_2$ removal efficiency over the venturi scrubber for comparable liquid to gas ratios. $SO_2$ removal with a shaped grid was 85% to 92% using L/G values of 15 to 25 (G is defined as the gas flow rate in cfm) A venturi scrubber obtains 30%–55% $SO_2$ removal at L/G values of 10 to 30. Similar efficiencies are obtained in tower scrubbers but only with significantly higher L/G ratios of 50–100.

Figure 3:
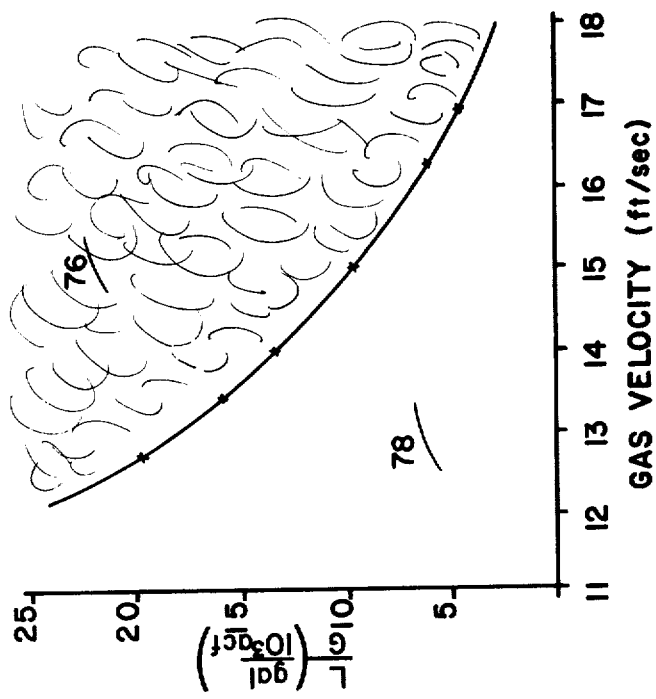
FIG. 3 is a graphical presentation based on empirical data, reflecting the liquid to gas ratio required to create a fluidized condition in the device for various gas velocities.

FIG. 3 reflects empirically derived data where L/G is plotted against gas velocity for the catenary shaped grid. The area 76 above the curve reflects the various L/G ratios for available gas velocities wherein the fluidization bed 70 results. Below the curve, in area 78, fluidization does not occur. For the contaminant removal efficiencies available with the present invention, for a given gas velocity, an L/G ratio is selected which will place the system's operation in zone 76.

Figure 4:
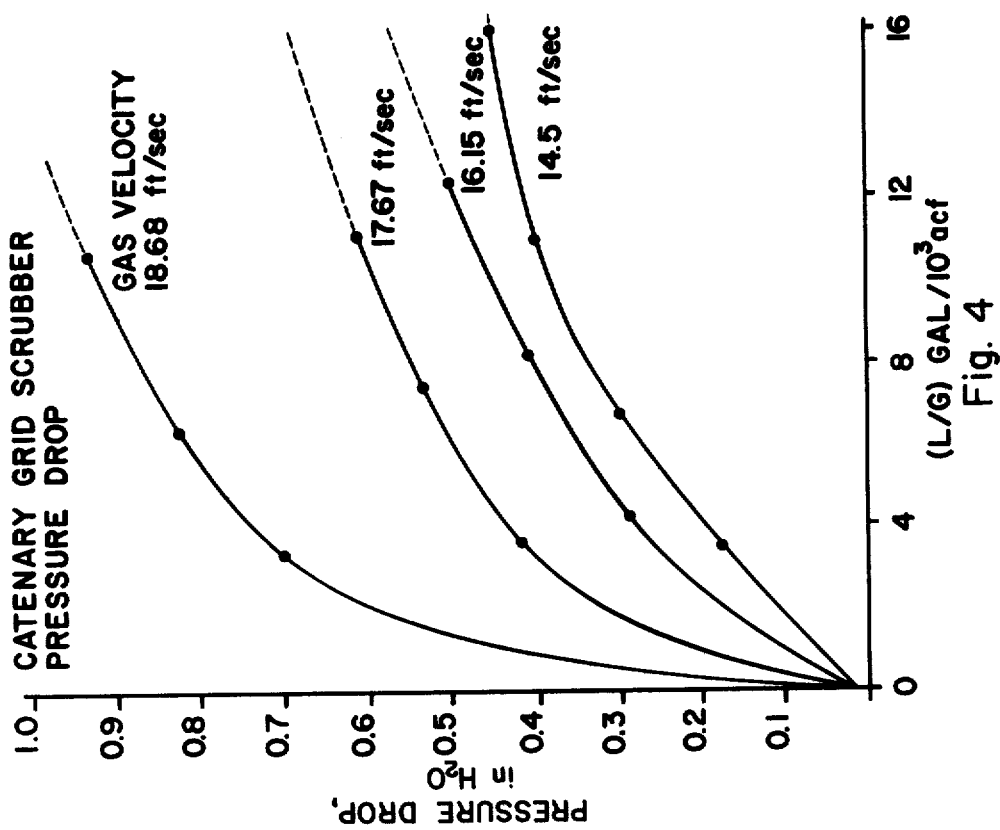
FIG. 4 is a graphical presentation based on empirical data, depicting the pressure drop in inches of water versus the liquid to gas ratio, for varying gas velocities.

FIG. 4 depicts various pressure drops for a single grid catenary scrubber at various gas velocities and liquid to gas ratios.

The pilot tests reveal that gas velocities in the catenary scrubber can be higher than those in a typical spray tower scrubber. Face velocities of up to 20 ft/sec produced no irregularities. Although no upper figure has been established yet, it is believed that face velocities of upwards of 25 fps are obtainable with a single grid. The higher gas velocities permit smaller, more economical towers thus saving initial investment expense and operating space.

Above 25 ft/sec, the pattern of the liquid flow will become discontinuous. Here the turbulent, fluidized scrubbing zone breaks down. Therefore, the pressure drop curves of FIG. 4 become discontinuous as shown by the dashed lines. Optimum gas velocity (based on best fluidization at the lowest L/G ratio) in the catenary appears to be about 16 ft/sec compared with 8–12 ft/sec in tower scrubbers. Good gas-liquid contacting is obtained under these conditions.

The lower pressure drops in wet operations as well as in dry operation permits temporary by-pass directly through the vessel in emergency conditions. Dry losses are, typically, only 0.2"–0.4" water per grid.

Figure 5:
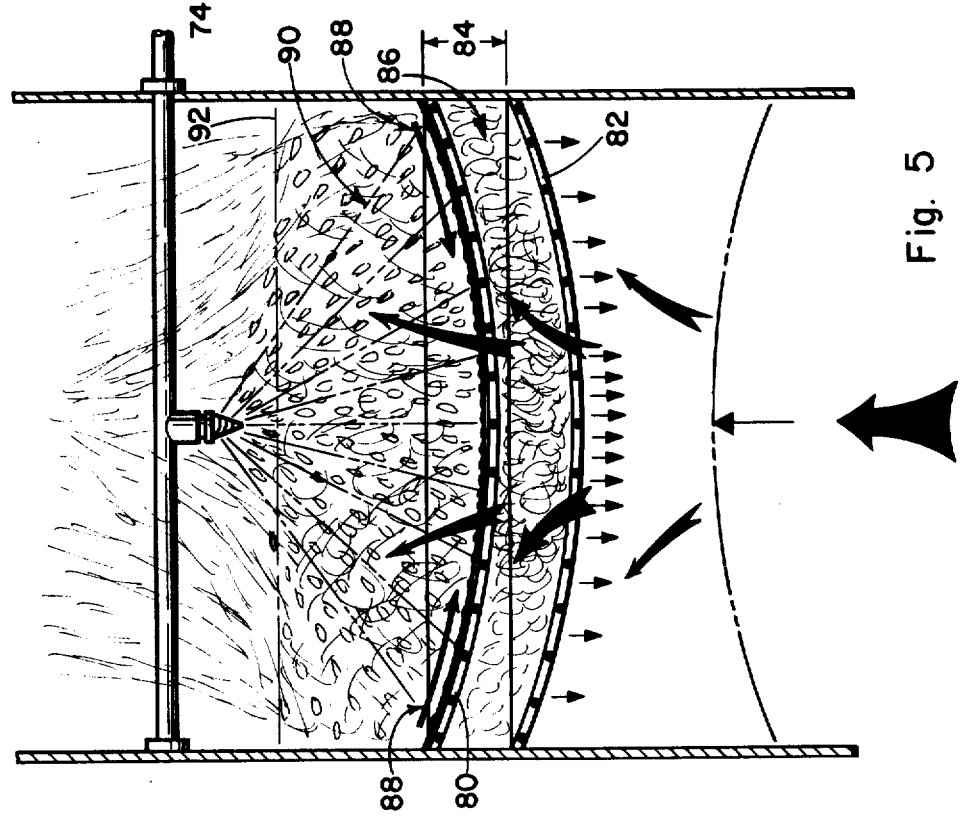
FIG. 5 is a schematic representation depicting the gas-liquid activity about a grid pair designed and disposed according to the principles of the present invention.

In the area of particulate removal, (+1 micron), the single grid has been found to be approximately 65% efficient. An extension of the principles of the basic invention includes the placement of a second grid in parallel with the first, separated by no more than a maximum prescribed distance. FIG. 5 depicts a grid pair which exhibits enhanced particulate removal.

Here the upper grid 80 of similar shape with the lower grid 82 is positioned up to an empirically determined distance 84 above the lower grid. In theory there is no set minimum spacing between the two, since with the one grid physically on top of the other, the performance of the system would be as a single grid.

The maximum distance 82 between the two will be a function of many variables including gas velocity, gas density and grid open area. For example, pilot test runs with a gas face-velocity of 30 fps (higher velocities are possible with the grid pair); grid open area of 60%; and, a gas density of 0.075 lbs/ft$^3$, resulted in a maximum spacing of approximately six inches.

Spacings generally between three to six inches result in improved performance. Generally, if gas density or velocity decreases, the spacing between the grids decreases. If grid open area decreases, spacing increases.

The primary consequence which controls the spacing is the creation of a turbulent zone in the area 86 between the grids. If the grids are too far apart, the flowing gas is able to re-establish the velocity pressure profile that it presented as it approached the lower grid.

The lower grid can be perceived as an energy dissipator. The random movement and reduced energy level of the gases in the zone 86 minimize the possibility of a turbulent zone immediately above the upper grid as is the case in a single grid arrangement. As a result the scrubbing grid forms a film on the top surface of the upper grid, with movement, again, towards the center of the vessel along paths 88.

With the scrubbing liquid film right on the top surface of the grid, enhanced particulate removal is obtained. Pilot runs indicate that with the double grid arrangement, 99.7% of +1 micron particulate matter is removed. This is for a total pressure drop of approximately 1.9 inches w.c. across the pair! This compares with a venturi scrubber which requires a drop of 8 to 10 inches w.c. for a cyclonic scrubber.

Again, a fluidized bed or zone 90 is created in the volume immediately above the upper grid. For all the same parameters, conditions and grid design, the upper surface 92 of the fluidized zone 90 is substantially the same distance above the upper grid as in the case of the single grid approach. Again, the fluidized zone is a controlled high density of scrubbing liquid per unit volume with enhanced liquid-particulate interaction, and gas absorption through increased surface area of scrubbing liquid.

Again the gas tends to redistribute itself towards the walls, as the liquid moves into the center of the vessel. The liquid penetrates and drains through the upper grid into the turbulent zone 86 where further reaction between the gas and scrubbing agent takes place. Finally, the liquid penetrates the lower grid 82 and falls into the bottom of the vessel, from where it is processed or recirculated.

The present design affords a very high turndown, i.e. the ratio of maximum tolerable gas flow to minimum gas flow, of three to one.

The present invention may be used with a single or plurality of single grids; or, a single pair or plurality of pairs; or, a mixture of single grids and pairs, to provide the required degree of gas and/or particulate absorption.

Although, the design of the grid reflects the mirror image of the gas-velocity profile summed with the static and dynamic heads of scrubbing liquids, it is to be understood that grid shapes approximating this design (such as the catenary) and employing the teachings of this invention can be utilized with expectedly, varying degrees of success in improved absorption and particulate removal.

Further, the embodiment disclosed a counter-current application of the principles of the invention. The design also has application to cocurrent scrubbers. In the latter, the gas flow and scrubbing liquid are applied to the concave side of the grid. In this application, typically, the grid will have less open area.

Further, since the liquid and gas are cocurrent the grid can be shallower.

The present design affords a degree of self-scouring because of liquid turbulence, a benefit where solids buildup can occur.

Further, with respect to retrofitting of existing systems, in many cases this can be done easily and relatively inexpensively, because no special tools, fixtures or rigging are required to install the grids. In fact, the design requires less space than conventional absorption devices.

However, in other existing systems it becomes impractical to use the grid configurations described above for retrofitting. Thus a modular concept has been developed employing the theoretical principles described which results in improved performance in the retrofitted towers, while remaining economically feasible.

FIGS. 6 through 10 depict the grid module approach employing the principles of the invention. FIG. 6 and FIG. 7 depict a quadrant or segment of a typical installation. A plurality of cylindrical modules such as module 100 are mounted on a plate 102 which includes a mounting flange 104 used to secure the plate to the vessel side walls or suspended plate support structure.

Each module includes a housing 105 which is fabricated from suitable material based on the application. The housings typically run up to two feet in length and can vary in diameter, e.g. 6", 8", 12", 18", 20", 24", depending principally on the gas flow rate (cfm), G, in the vessel and the vessel diameter. Generally, the housings in a given vessel are uniform in length and diameter.

The velocity profile of the gas flow for each module is empirically determined knowing the gas velocity in the unmodified vessel (i.e., without the module plates). Generally the gas flow rate in each module will be the gas flow rate in the unmodified vessel divided by the number of modules to be used.

The design of the grid structure for the individual housings is based on the liquid and gas characteristics within each module, in accordance with the design criteria set forth above for a vessel grid structure.

FIG. 8 (showing two grid structures per module although the module adaption employs the single grid structure as well), depicts one way of introducing the liquid medium onto the concave side of the grid. The liquid 108 is dispensed onto the plate 110 to which the modules are secured. The liquid reaches the top 112 of the housing and spills over into the module towards the concave side of the upper grid structure 114. The entering gas stream 116 interacts with the liquid medium above the grid structure(s) and the fluidized bed or zone 117 created, resulting in the desired mass transfer reaction between the two. The height of the housing walls above the grid(s) is sufficient to accommodate the height of the fluidized bed. The flow rate of the liquid cascading down onto the grid(s) will be a function of the rate at which the liquid is dispensed onto the plate 110, and must be at least sufficient to result in the controlled fluidication bed above the concave side of the grid for the gas velocity within the module. This again is in accordance with the design criteria discussed above. After an interaction period with the gas medium, the liquid droplets in the fluidized bed eventually coalesce and drain down through the grids and into the bottom of the vessel where the liquid can be recovered, processed and then reused.

FIG. 9 shows yet another embodiment depicting an alternate way of introducing the liquid medium above the grid structures. Here the liquid deposited on the plate 118 enters the module (e.g. 120) through openings such as 122 and 124. The height of the liquid on the plate is above the openings to provide a hydraulic seal. This prevents gas by-pass through the liquid entry points. Again the openings are designed so that a sufficient liquid flow rate onto the grid(s) occurs, resulting in a controlled fluidization bed above the grid pair.

This grid module variation described consists of a grid or grid pair (or multiple grid or grid pairs) in a cylindrical housing. A square housing or similar configuration can likewise be employed.

Other ways of dispensing the liquid medium onto the grid structure should also be obvious in view of the teachings herein.

What is claimed is:

1. A gas-liquid contact apparatus comprising a housing member including an inlet and outlet and interconnecting ductwork between said inlet and outlet characterized by:
   (a) at least one grid member suspended within said ductwork, the grid member disposed perpendicular to the direction of the flow of gas at said grid member; and
   (b) means for dispensing a selected flow rate (L) of liquid onto said grid member(s),
said grid member(s) constructed, having a cross sectional profile ideally equal to the sum of the predetermined theoretical velocity pressure profile of the gas flowing in said interconnecting ductwork and the static and dynamic head of the dispensed liquid, said liquid dispensed onto the concave side of said grid member, said selected liquid flow rate (L) for a given average gas velocity at least sufficient to result in a controlled fluidization bed above the concave side of said grid member.

2. A gas-liquid contact apparatus comprising a housing member including an inlet and outlet and interconnecting ductwork between said inlet and outlet characterized by:
   (a) at least one group of modules, each module including (i) its own housing member, having an inlet and outlet, and (ii) at least one grid member suspended therein;
   (b) means for mounting the grouping of modules to the interconnecting ductwork in a plane perpendicular to the flow of gas at said plane, said grid member within each module disposed perpendicular to the direction of gas flow at said grid member, the flow rate of gas through each module approximately equal to the flow rate of gas through the ductwork divided by the number of modules in said grouping; and
   (c) means for dispensing a selected flow rate of liquid onto the grid member(s) within each module, said grid member(s) within each module constructed having a cross sectional profile ideally equal to the sum of the predetermined theoretical velocity pressure profile of the gas flowing in each said module and the static and dynamic head of the dispensed liquid, said liquid dispensed onto the concave side of each said grid member, said selected liquid flow rate for a given average gas velocity in each module at least sufficient to result in a controlled fluidization bed above the concave side of each said grid member.

3. The device claimed in either claim 1 or 2 wherein said grid member(s) include an additional depth whereby an energy imbalance is created between the energy level of the dispensed liquid and that of the flowing gas, in favor of the dispensed liquid, such that the liquid eventually drains from the controlled fluidization bed through said grid member(s).

4. The apparatus claimed in claim 3 wherein said grid member(s) is catenary shaped, said grid member(s) having a perigee depth, $d_c$, determined by the equation: $d_c=P_{vc}+H_{SL}+H_{DL}+d_+$, where $P_{vc}$ is the velocity pressure of the gas at the perigee, $H_{SL}$ is the static head of the dispensed liquid, $H_{DL}$ is the dynamic head of the dispensed liquid and $d_+$ is the additional depth to create an energy imbalance in favor of the dispensed liquid.

5. The apparatus claimed in claim 3 wherein the cross sectional profile of said grid member approximates the ideal design sufficiently whereby said controlled fluidication bed results.

6. The apparatus claimed in claim 3 wherein there is at least one grid pair suspended within said ductwork, or module housing member, the grid members of each of said pair(s) set at a predetermined distance from each other.

7. The apparatus claimed in claim 3 wherein said grid member(s) are fabricated from a flexible material, whereby accumulated matter may be dislodged by flexing of said grid member(s).

8. The apparatus claimed in claim 3 wherein the grid(s) open area is between 50 to 85%.

9. The apparatus claimed in claim 8 wherein the grid(s) open area is between 50 to 75%.

10. The apparatus claimed in claim 3 wherein the additional depth is in the range of 5% to 40%.

* * * * *